United States Patent
Motoi et al.

(10) Patent No.: US 9,519,268 B2
(45) Date of Patent: Dec. 13, 2016

(54) LAMINATED BODY HAVING HOLOGRAM (71) Applicant: Dai Nippon Printing Co., Ltd., Tokyo (JP)

(72) Inventors: Takumi Motoi, Ushiku (JP); Toru Nishioka, Ushiku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/141,137

(22) Filed: Apr. 28, 2016

(65) Prior Publication Data

US 2016/0274538 A1    Sep. 22, 2016

Related U.S. Application Data (63) Continuation of application No. 14/002,946, filed as application No. PCT/JP2012/055320 on Mar. 2, 2012, now Pat. No. 9,354,603.

(30) Foreign Application Priority Data

Mar. 3, 2011 (JP) ................................. 2011-046985

(51) Int. Cl.
*B42D 25/00* (2014.01)
*B42D 25/328* (2014.01)
(Continued)

(52) U.S. Cl.
CPC ............ *G03H 1/0256* (2013.01); *B42D 25/00* (2014.10); *B42D 25/328* (2014.10);
(Continued)

(58) Field of Classification Search
CPC ...... B42D 25/351; B42D 25/328; B42D 25/00
See application file for complete search history.

(56) References Cited

U.S. PATENT DOCUMENTS 4,818,045 A * 4/1989 Chang ................ G02B 27/0103 359/13
4,988,151 A * 1/1991 Moss ................. G02B 27/0103 359/30

(Continued)

FOREIGN PATENT DOCUMENTS

JP          85102 B    10/1994
JP    2000-172157 A     6/2000
(Continued)

OTHER PUBLICATIONS

Extended European Search Report Dated Oct. 9, 2015 for EP12752179.7.
(Continued)

*Primary Examiner* — Kyle Grabowski
(74) *Attorney, Agent, or Firm* — Locke Lord LLP (57) ABSTRACT

A card 1 includes: a card substrate 10; a transparent hologram layer 20 on a part of the substrate 10; and a surface layer 30 comprising a print layer 40 on the substrate 10 and the layer 20, is formed by a transparent material, and is printed with a color similar to the upper surface of the substrate 10. When a card surface 1a is viewed from the normal line, the layer 40 has the same color shading compared to the upper surface of the substrate 10, at the edge portion 22 of the layer 20. The layer 40 includes a gradation portion 43 wherein the color is gradually lighter from an outer edge portion 43a at the inner side of the edge portion 22 of the layer 20 toward the inner portion, a window portion 44 is formed at an image 21 portion of the layer 20.

5 Claims, 6 Drawing Sheets (51) Int. Cl.
*B42D 25/351* (2014.01)
*G03H 1/02* (2006.01)
*G03H 1/00* (2006.01)

(52) U.S. Cl.
CPC ......... *B42D 25/351* (2014.10); *G03H 1/0011* (2013.01); *G03H 2250/33* (2013.01); *G03H 2270/32* (2013.01)

(56) References Cited

U.S. PATENT DOCUMENTS

| | | | |
|---|---|---|---|
| 2002/0056990 A1 | 5/2002 | Scheggetman et al. | |
| 2003/0127847 A1* | 7/2003 | Keller | B42D 25/00 283/109 |
| 2005/0230959 A1* | 10/2005 | Nemeth | B42D 25/00 283/74 |
| 2008/0036195 A1 | 2/2008 | Winchcombe | |

FOREIGN PATENT DOCUMENTS

| | | | |
|---|---|---|---|
| JP | 2001-113863 A | | 4/2001 |
| JP | 2001-293982 A | | 10/2001 |
| JP | 2003288018 A | | 10/2003 |
| JP | 2003288018 A | * | 10/2003 |
| JP | 2005-103957 A | | 4/2005 |
| WO | WO-9813211 A1 | | 4/1998 |
| WO | WO-03095218 A1 | | 11/2003 |

OTHER PUBLICATIONS

Security Holograms (Oct. 2010) https://web.archive.org/web/20101009230710/http://www.dnp.co.jo/international/holo/product/secu.html.

International Search Report of PCT/JP2012/055320.

* cited by examiner

FIG. 6B

LAMINATED BODY HAVING HOLOGRAM

CROSS-REFERENCE TO RELATED APPLICATIONS

This application is a continuation application of U.S. patent application Ser. No. 14/002,946 filed on Nov. 12, 2013, which was the national phase under 35 U.S.C. §371 of PCT International Application No. PCT/JP2012/055320, filed Mar. 2, 2012, which claims the benefit of Japanese Patent Application No. 2011-046985, filed Mar. 3, 2011, the entire contents of the aforementioned applications are hereby incorporated herein by reference.

TECHNICAL FIELD

The present invention relates to a laminated body having a hologram.

BACKGROUND ART

Conventionally, there has been an information recording body in which a hologram layer is laminated on the surface (for example, Patent Document 1).

However, for the conventional information recording body, the edge portion of the hologram layer can be seen, and thus a sense of unity (an appearance seen as one object) between the hologram and the information recording body has been lacking. [Patent Document 1] Japanese Unexamined Patent Application, Publication No. 2001-293982

DISCLOSURE OF THE INVENTION

Problems to be Solved by the Invention

The object of the present invention is to provide a laminated body that improves the sense of unity between the laminated body and the hologram layer, and improves the visual effect of the hologram.

Means for Solving the Problems

The present invention solves the problem by way of the following such means. It should be noted that, in order to facilitate understanding, reference symbols corresponding to the embodiment of the present invention are assigned and explained; however, it is not to be limited thereto. In addition, configurations explained by assigning reference symbols may be improved as appropriate, and at least a part may be substituted with other components.

A first aspect of the present invention is a laminated body having a hologram, the laminated body including: a card substrate (10, 210, 310, 410); a transparent hologram layer (20, 220, 320, 420) laminated on a part of a region of the card substrate; and a surface layer (30, 230, 330, 430) that is laminated upper than the card substrate and the transparent hologram layer, is formed from a transparent material, and has a print layer (40, 240, 340, 440) printed in the same color as the card substrate, in which, when viewing the top surface of the laminated body from a normal line direction, the print layer is the same or substantially the same color shading as a surface of the card substrate at an edge portion (22) of the transparent hologram layer, and includes a gradation portion (43) forming a window portion (44) in a picture (21) portion of the transparent hologram layer, in which the color shading becomes lighter as approaching further inwards from a portion (43a) more inwards than the edge portion of the transparent hologram layer.

A second aspect of the present invention is a laminated body having a hologram as described in the first aspect, in which the top surface of the card substrate (10, 210, 310, 410) and the print layer (40, 240, 340, 440) are dark colors.

A third aspect of the present invention is a laminated body having a hologram as described in the first or second aspect, in which the card substrate (10, 210, 310, 410) includes: at least two substrate layers (211, 311, 411, 213, 313, 413), and an adhesion layer (212, 312, 412) that bonds between layers of the at least two substrate layers.

A fourth aspect of the present invention is a laminated body having a hologram as described in any one of the first to third aspects that includes: an emboss (270, 370, 470) in a region of the transparent hologram layer (220, 320, 420), when viewing the surface of the laminated body (201, 301, 401) in a normal line direction.

A fifth aspect of the present invention is a laminated body having a hologram as described in any one of the first to fourth aspects that includes: a printing adhesive layer (414) that is provided by way of printing on the top surface of the card substrate (410), and bonds between the card substrate and the surface layer, and between the card substrate and the hologram layer (420).

A sixth aspect of the present invention is a laminated body having a hologram as described in any one of the first to fifth aspects, in which the print layer (340) is provided on a lower surface of the surface layer (330).

A seventh aspect of the present invention is a laminated body having a hologram as described in any one of the first to fifth aspects, in which the print layer (40, 240, 440) is provided on a top surface of the surface layer (30, 230, 430).

An eighth aspect of the present invention is a laminated body having a hologram as described in any one of the first to seventh aspects in which the top surface of the laminated body (401) is matt finished.

A ninth aspect of the present invention is a laminated body having a hologram, in which the hologram is a Lippmann type hologram.

A tenth aspect of the present invention is a laminated body having a hologram, in which the laminated body (1, 201, 301, 401) is a card.

Effects of the Invention

According to the present invention, a laminated body is provided that improves the sense of unity between the laminated body and the hologram layer, and improves the visual effect of the hologram.

EXPLANATION OF REFERENCE NUMERALS 1 card
10 card substrate
20 hologram layer
30 surface layer
40 print layer
43 gradation portion
44 window portion
1, 201, 301, 401 card
10, 210, 310, 410 card substrate
20, 220, 320, 420 hologram layer
30, 230, 330, 430 surface layer
40 print layer
43 gradation portion
44 window portion
240, 340, 440 upper print layer
250, 350, 450 bottom layer
260, 360, 460 lower print layer
270, 370, 470 emboss
211, 311, 411 lower substrate
212, 312, 412 adhesion layer
213, 313, 413 upper substrate
226, 326, 426 hologram formation layer
227, 327, 427 hologram protective layer
231, 331, 431 magnetic strip
413a, 430a matt surface
414 silk-screening layer

PREFERRED MODE FOR CARRYING OUT THE INVENTION

First Embodiment

Hereinafter, embodiments of the present invention will be explained while referencing the drawings, etc.

Figure 1A:
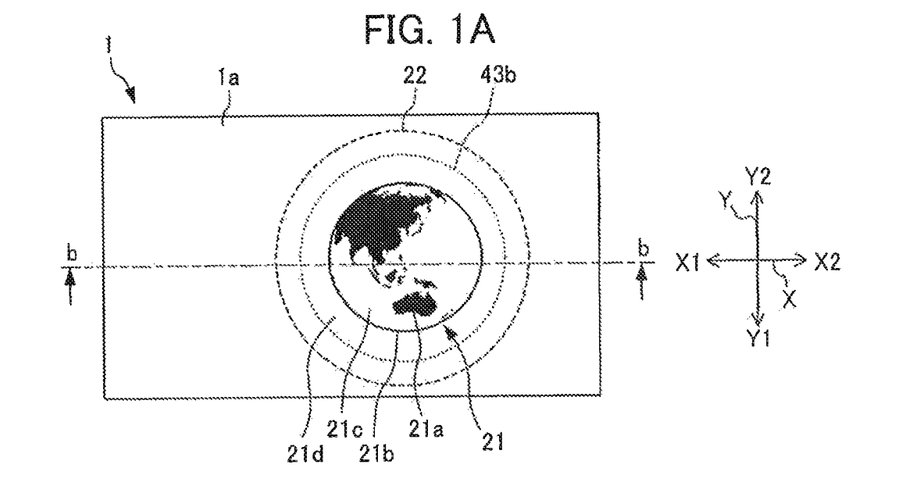
FIGS. 1A-1C are plan view and cross-sectional views of a card 1 of a first embodiment.
Figure 1B:
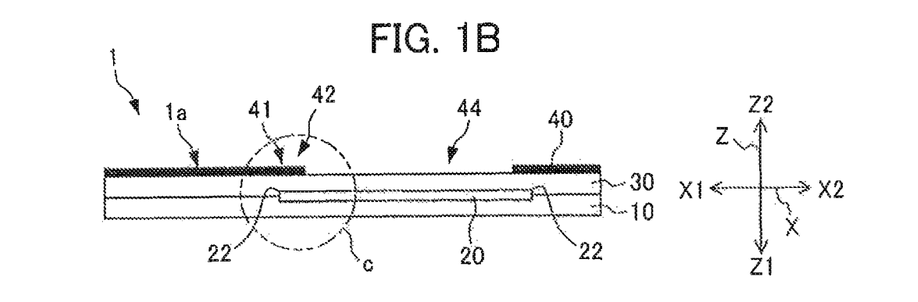
Figure 1C:
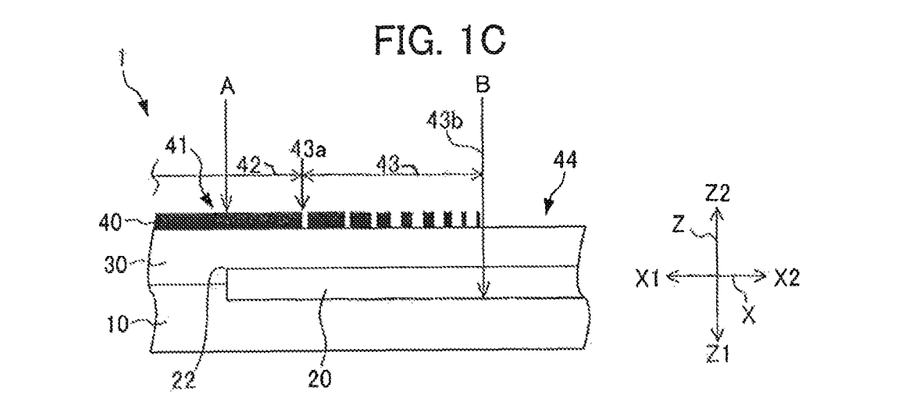

FIGS. 1A-1C are a plan view and cross-sectional views of a card 1 of a first embodiment.

FIG. 1A is a plan view of the card 1 (view looking at the card top surface (surface) 1a from a normal line direction).

FIG. 1B is a cross-sectional view of the card 1 (cross-sectional view along the arrow b-b in FIG. 1).

FIG. 1C is an enlarged view inside of the two-dot dashed line c in FIG. 1B.

It should be noted that, in the following explanation, the shape in the plan view (FIG. 1A) of the card 1 is called arbitrarily a planar shape. In addition, each figure illustrates the configuration relating to the hologram to be large.

The card 1 (laminated body) has a hologram layer 20 and surface layer 30 laminated on a card substrate 10 from the bottom side Z1 (card back side) to the top side Z2 (card top surface (surface) side). Each of these layers is formed from a resin sheet material such as PET (polyethylene terephthalate), PET-G, PVC (polyvinyl chloride), and polycarbonate. Between each layer can be bonded by an adhesion layer or adhesive layer, and can be bonded by thermocompression bonding.

The card 1 is applied to a credit card, etc., for example.

For this reason, the card 1 includes an IC chip, external contact terminal, contact-less communication coil antenna (for example, conducting wire antenna, etching antenna, etc.), magnetic strip, and a layer supporting these components. Detailed explanations of these are omitted.

The card substrate 10 is a component serving as a base of the card 1. It should be noted that, although an example providing a layer configuration on the top side Z2 of the card substrate 10 is explained in the first embodiment, a layer configuration may be provided also on the bottom side Z1 of the card substrate 10, as necessary.

The color of the top surface of the card substrate 10 is black, and includes on the order of about 1% carbon black, for example. The color of the top surface of the card substrate 10 may be the as-is color of the card substrate 10, or in the case of making a printing on the top surface of the card substrate 10, may be the color of this printing.

The hologram layer 20 is a layer in which a transparent hologram having translucency is formed.

The transparent hologram is a Lippmann type of hologram. A Lippman type of hologram is one coating a particular polymer layer on a film, and forming an interference fringe by the change in refractive index inside this polymer layer. The Lippman type of hologram reproduces a hologram image by the diffraction phenomenon, when light is incident on this interference fringe. The Lippman type of hologram excels in the presentation of three-dimensionality and a sense of depth in top and bottom, and left and right directions, and three-dimensionality closer to the object of the genuine article is obtained. Because the materials used and manufacturing process are unique, forgery is extremely difficult, and thus the Lippmann type of hologram can improve the forgery prevention effect over a hologram of embossment type, for example.

In the hologram layer 20, a hologram picture 21 of a globe is recorded. In the hologram picture 21, information (picture) is recorded in a portion of the land 21a and out line 21b, and an ocean 21c and an external portion 21d more outside the out line 21b are transparent. For this reason, the portions of the land 21a and out line 21b are seen three-dimensionally. In addition, for the ocean 21c and inside of a window portion 44 (described later) of the external portion 21d, the top surface of the card substrate 10 can be confirmed by sight by light penetrating.

As shown in FIG. 1A, the outer shape of the hologram layer 20 is smaller than the outer shape of the card 1. In other words, the hologram layer 20 is laminated only on a region of a part of the card substrate 10. This is for reducing the cost by reducing the hologram layer 20, which is expensive.

The surface layer 30 is laminated upper direction Z2 than the card substrate 10 and hologram layer 20.

The surface layer 30 is formed by a transparent material. The top surface of the surface layer 30, i.e. card top surface 1a, is formed as a mirror finished surface. It should be noted that, due to the card top surface 1a being a mirror finished surface, the hologram picture 21 is sharply observed, which can improve the three-dimensionality.

A print layer 40 is provided on the top surface of the surface layer 30.

The print layer 40 is formed by pressurizing a transfer foil provided on PET onto the top surface of the surface layer 30 with plates to transcribe. The top surface of this plate may be mirror finished surface form, or a matt form; however, the matt form is preferred because the transcription suitability is better than the mirror finished surface form, and convexities in the card due to foreign matter are smaller. It should be noted that, in either case, it is possible to form the card top surface 1a as a mirror finished surface.

The print layer 40 is a layer printed in a similar color black as the card substrate 10. The print layer 40 contains carbon black on the order of 15 to 30%, for example.

In a planar shape, the portion 41 of the print layer 40 overlapping the edge portion 22 of the hologram layer 20 and a region 42 in the vicinity thereof are color shadings the same or substantially the same as the card substrate 10.

The print layer 40 has a gradation portion 43.

The gradation portion 43 is a portion gradation printed so that the color shadings become lighter as approaching further inside from the exterior edge portion 43a located in more inside than the edge portion 22 of the hologram layer 20. The color shadings inside the gradation portion 43 become gradually lighter from 100% at the exterior edge portion 43a to 0% at the interior edge portion 43b. The portion more inside than the interior edge portion 43b of the gradation portion 43 becomes the window portion 44.

In the window portion 44, the transparent surface layer 30 is completely exposed. For this reason, the entirety of the hologram picture 21 of the hologram layer 20 can be confirmed by sight from the window portion 44.

Next, the appearance of the card 1 from the top side Z2 will be explained.

(Vicinity of Edge Portion 22 of Hologram Layer 20)

As described previously, the portion 41 of the print layer 40 overlapping the edge portion 22 of the hologram layer 20 and the region 42 in the vicinity thereof are color shadings the same or substantially the same as the card substrate 10. For this reason, the edge portion 22 of the hologram layer 20 is concealed by the print layer 40 (refer to arrow A). Furthermore, since the card substrate 10 and print layer 40 are dark colors, which absorb light, the edge portion 22 of the hologram layer 20 can almost not be confirmed by sight.

(Gradation Portion 43)

Only the color of the print layer 40 is confirmed by sight at the external edge portion 43a of the gradation portion 43. Since the hologram layer 20 is transparent, the card substrate 10 can be gradually confirmed by sight as approach the inside from the external edge portion 43a. Additionally, it is configured so that only the color of the card substrate 10 is confirmed by sight at the internal edge portion 43b of the gradation portion 43 (refer to arrow B). Furthermore, the print layer 40 and card substrate 10 are the same color black. For this reason, the print layer 40 and card substrate 10 are confirmed by sight to be integrated like a seamless identical component.

(Window Portion 44)

Inside of the window portion 44, the print layer 40 is not formed on the surface layer 30; therefore, it is possible to confirm the hologram picture 21 of the hologram layer 20. Since the hologram is a transparent hologram, the color of the card substrate 10 is confirmed by sight at the back thereof. In addition, as previously mentioned, the print layer 40 and card substrate 10 are confirmed by sight to be seamlessly integrated.

For this reason, the periphery of the hologram picture 21 is observed such that the back in black is present in a wider range than the hologram layer 20. In addition, since the portion of the ocean 21c of the hologram picture 21 is transparent, the color of the card substrate 10 is confirmed by sight.

Thereby the portions of the land 21a and outline 21b of the globe appear to be float up from the black background and the hologram picture 21 is observed more three-dimensionally.

It should be noted that the above-mentioned visual effect of the card 1 of the first embodiment has been confirmed by experiments.

As explained above, the card 1 of the first embodiment, even in the case of the hologram layer 20 being provided only to a partial region, can improve the effect of the hologram being seen three-dimensionally from the entirety of the card 1. In addition, it is thereby possible to produce a high quality sensation.

Furthermore, even though the Lippmann type of hologram is transparent, it has a greater visual effect to be seen three-dimensionally than an embossed hologram, for example. The card 1 of the first embodiment employs this characteristic of Lippmann type holograms, whereby the card substrate 10 disposed on the back side of a transparent hologram layer 20 can be seen, and the hologram picture 21 appears three-dimensionally.

Furthermore, the Lippmann type hologram is difficult to forge, and sophisticated manufacturing techniques are further required to accommodate the hologram layer 20 inside of the card 1 and to make the edge portion 22 of the hologram 20 inconspicuous by the above configuration. For this reason, it is possible to improve the effect of forgery prevention of a credit card or the like.

Second Embodiment

Next, a second embodiment of the present invention will be explained.

It should be noted that, in the explanation and drawings for each of the following embodiments, the same reference symbol or the same reference symbol at the end (last two digits) is assigned to a portion fulfilling a similar function as the aforementioned first embodiment, and explanations that would be redundant are omitted as appropriate.

Figures 2A, 2B, 2C:
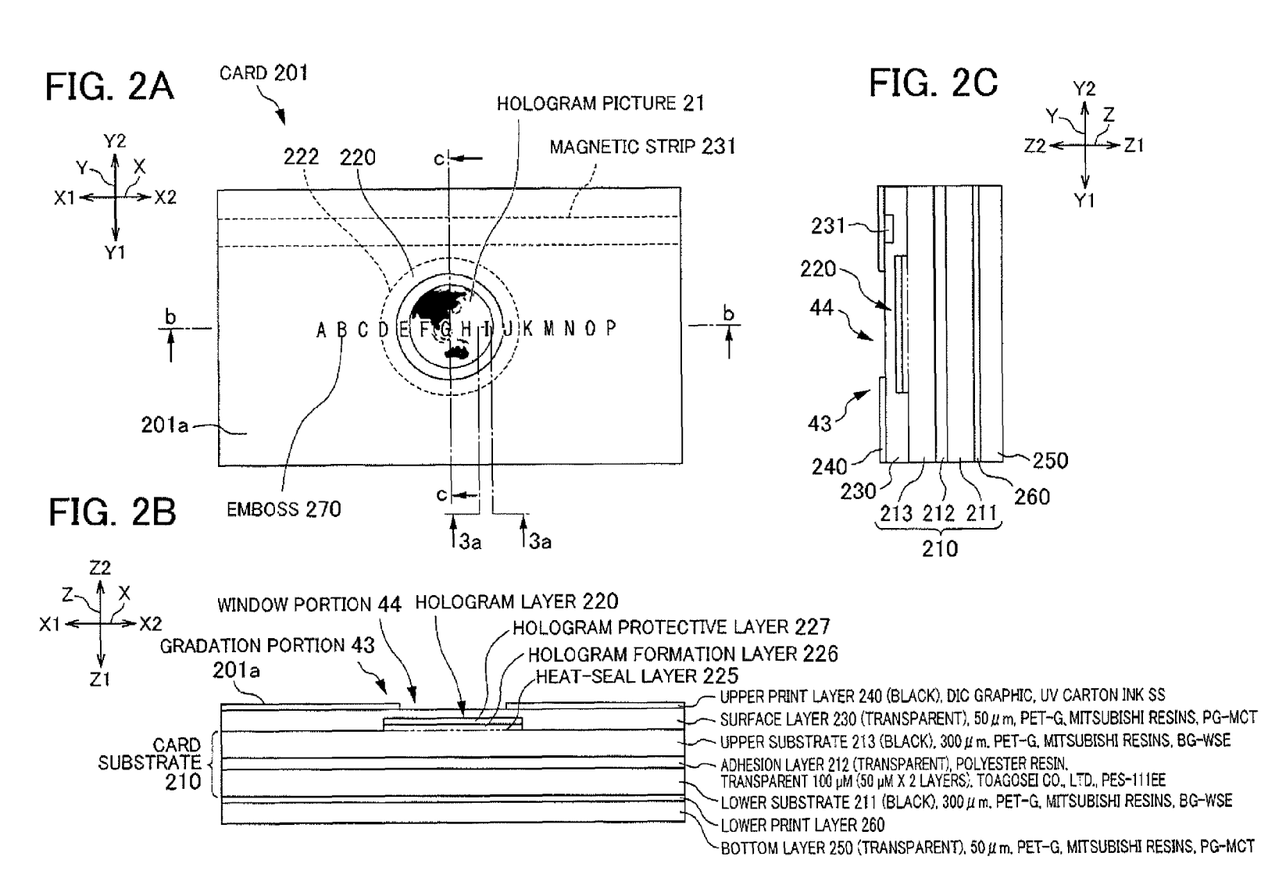
FIGS. 2A-2C are a plan view and cross-sectional views of a card 201 of a second embodiment.

FIGS. 2A and 2B are a plan view and cross-sectional views of a card 2001 of a second embodiment.

FIG. 2A is a plan view of a card 201 (view looking at card top surface (surface) 201a from normal line direction).

FIG. 2B is a cross-sectional view of the card 201 (cross-sectional view along the line b-b in FIG. 2).

FIG. 2C is a cross-sectional view of the card 201 (cross-sectional view along the line c-c in FIG. 2).

It should be noted that illustrations of cross-sectional forms of the emboss 270 have been omitted in FIG. 2B and FIG. 2C.

The card 201 includes a card substrate 210, hologram layer 220, surface layer 230, magnetic strip 231, upper print layer 240, bottom layer 250, lower print layer 260, and emboss 270.

The card substrate 210 includes a lower substrate 211 and upper substrate 213, and an adhesion layer 212 bonding between the lower substrate 211 and upper substrate 213. In other words, in the card 201, the card substrate 210 is formed by the two layers of the lower substrate 211 and upper substrate 213.

The lower substrate 211 and upper substrate 213 are layers of the same material properties and same thickness. Between the lower substrate 211 and upper substrate 213, a functional component such as an electronic component is not provided, and only the adhesion layer 212 is present. In other words, the card substrate 210, although a single-layer configuration is originally possible, is made a two layer configuration for processing performance during the embossing processing, a durability improvement against bending, etc. as described later.

The hologram layer 220 is formed by a hologram formation layer 226 and hologram protective layer 227 being laminated on order from the bottom side Z1.

The hologram formation layer 226 is a similar component to the hologram layer 220 of the first embodiment. The hologram formation layer 226 is adhered on the top surface of the upper substrate 213 by a transparent heat-seal layer 225.

The hologram protective layer 227 is a protective sheet that protects the hologram formation layer 226. The hologram protective layer 227 is adhered on the top surface of the hologram formation layer 226. The hologram protective layer 227 is formed by transparent PET or the like.

Herein, the production processing of the card 201 includes a pressurizing step, heating step, etc. By providing this hologram protective layer 227, in the card 201, the collapse of the hologram structure of the hologram formation layer 226 can be suppress in these steps. It should be noted that the suppressing effect has been confirmed by comparative study and experiments.

The surface layer 230 and upper print layer 240 are the same as the surface layer 30 and print layer 40 of the first embodiment.

It should be noted that a bonded structure is not provided between the lower surface of the surface layer 230 and top surface of the hologram protective layer 227. For this reason, between the lower surface of the surface layer 230 and the top surface of the hologram protective layer 227 is configured so that between the top surface of the upper substrate 213 and the lower surface of the surface layer 230 is adhered around the hologram layer 220, whereby lifting (peeling) is suppressed.

The magnetic strip 231 is laminated on the top surface of the surface layer 230. The magnetic strip 231 is arranged in a region other than the window portion 44 and gradation portion 43 in a plan view. For this reason, the magnetic strip 231 is configured so as to be concealed by the upper print layer 240 and not to be visible from the card upper surface 201a.

Information relating to the bank account number, etc. of a bank or credit company is recorded in the magnetic strip 231. This information can be read using a reader (not illustrated).

The bottom layer 250 is the same component as the surface layer 230. In other words, in the card 201, a layered configuration is provided also on the bottom side Z1 of the card substrate 210. A magnetic strip, etc. is provided on the bottom layer 250 as necessary, similarly to the surface layer 230.

The lower print layer 260 is provided on the top surface of the bottom layer 250. The print layer is formed by transcribing a transcription foil provided on PET. In other words, the lower print layer 260 is formed similarly to the upper print layer 240. However, the lower print layer 260 does not include the gradation portion 43 and window portion 44. This is because the card 201 is not of a specification for observing a hologram picture from the lower surface. The lower print layer 260 has various information (characters, symbols, graphics), design picture, etc. of the card 201.

It should be noted that the lower print layer 260 is covered by the lower layer 250 and not exposed; therefore, it can suppress staining.

The emboss 270 is arranged not only outside of the window portion 44, but also inside of the window portion 44, i.e. on the hologram layer 220, in a plan view.

The emboss 270 is formed so as to make a convexity on the top side Z2, on the top surface of the card 201.

Examples of the material, thickness and color of the main layers are as below from the top side Z2.

Surface layer 230: transparent, 50 μm, PET-G, Mitsubishi Resins, PG-MCT

Upper substrate 213: black, 300 μm, PET-G, Mitsubishi Resins, BG-WSE

Adhesion layer 212: transparent, polyester resin, transparent 100 μm (50 μm×2 layers), Toagosei Co., Ltd., PES-111EE Lower substrate 211: same as upper substrate 213 Bottom layer 250: same as surface layer 230

It should be noted that the adhesion layer 212 was made in a two-layer configuration in order to adjust the thickness. If a 100-μm adhesion layer can be obtained commercially in a single layer, the adhesion layer 212 may employ this.

The color of the card lateral surfaces will be explained.

The adhesion layer 212 is transparent. In addition, although explanation and illustration are omitted, between the other layers (e.g., between upper substrate 213 and surface layer 230), a transparent adhesion layer that bonds between these is also included. The layers exposed at other layer surfaces (lower substrate 211, upper substrate 213, etc.) are black.

Herein, the transparent layers have a tendency to be observed as black when seen from the card lateral surfaces. For this reason, the entirety of the lateral surfaces is observed as black, thereby the appearance of the card 201 is not disfigured.

(Comparison with Comparative Examples of Emboss Appearance)

As mentioned above, the card substrate 210 is configured by bonding between the lower substrate 211 and upper substrate 213 with the adhesion layer 212. It has thereby been confirmed by performing actual experiments that the card 201 can improve the appearance of the emboss 270, according to comparison with Comparative Examples.

Figure 3A:
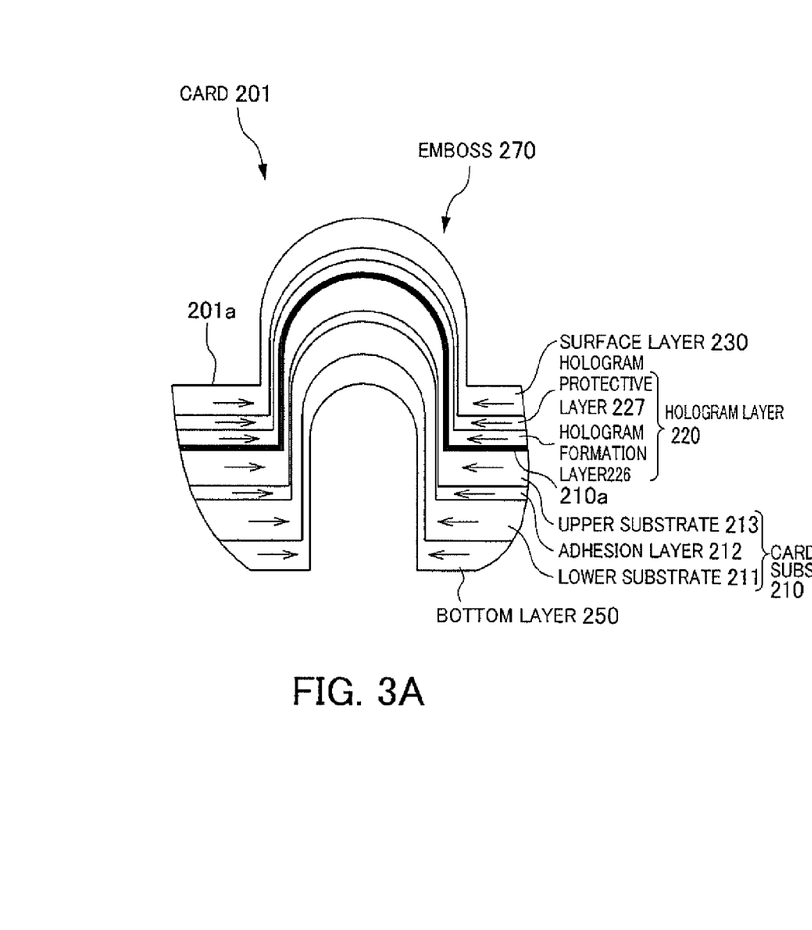
FIGS. 3A-3B are cross-sectional views schematically showing a cross section in the vicinity of an embossed part of the second embodiment and a comparative example.
Figure 3B:
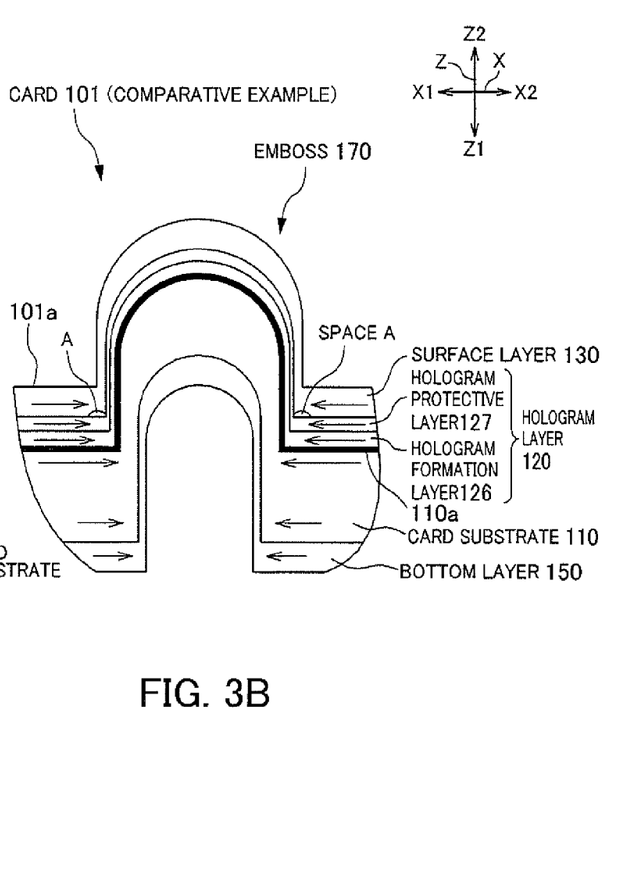

FIGS. 3A-3B are cross-sectional views schematically showing cross sections in the vicinity of an embossed part of the second embodiment and a comparative example.

FIG. 3A is a cross-sectional view (cross-sectional view of 3a-3a part in FIG. 2) in the vicinity of an embossed part of the second embodiment.

FIG. 3B is a cross-sectional view in the vicinity of the embossed part of a comparative example.

Figure 4A:
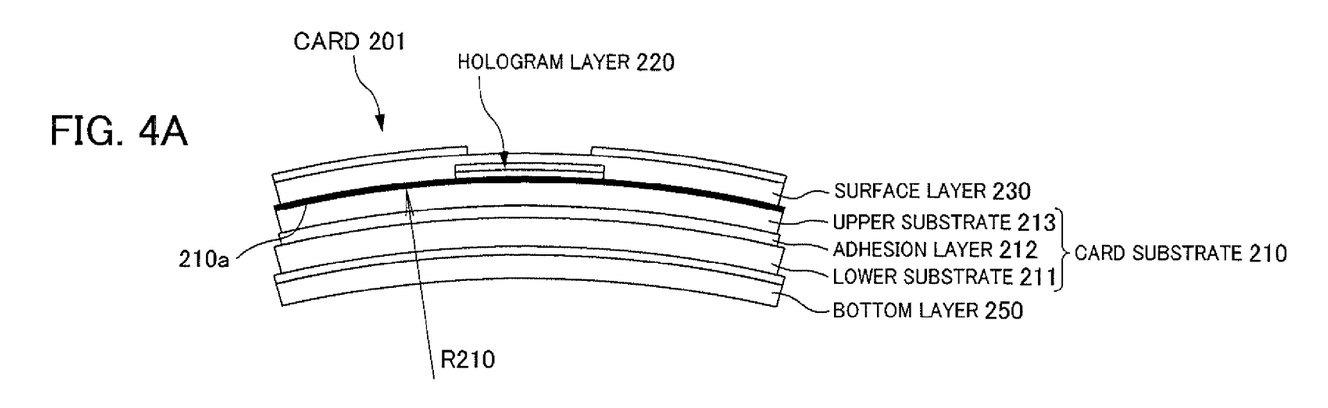
FIGS. 4A-4B are cross-sectional views of a state in which the card 201 of the second embodiment or card 101 of the comparative example are bent to an top side Z2 so as to make a convex shape.
Figure 4B:
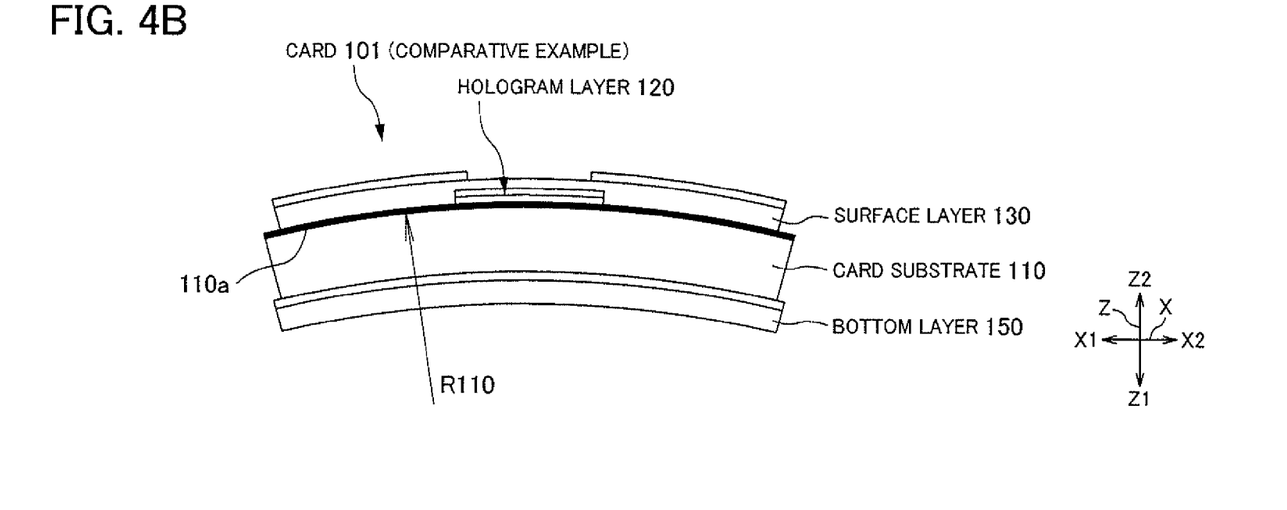

FIGS. 4A-4B are cross-sectional views of a state in which the card 201 of the second embodiment or card 101 of the comparative example are bent so as to make a convex shape to the top side Z2.

FIG. 4A is a cross-sectional view of the card 201 of the second embodiment.

FIG. 4B is a cross-sectional view of the card 101 of a comparative example.

As shown in FIG. 3B, the card 101 of the comparative example has the card substrate 110 formed by a sheet of one layer. In the card substrate 110, the materials are the same as the lower substrate 211 and upper substrate 213 of the second embodiment, and the thickness is the same as the thickness from adding the lower substrate 211 and upper substrate 213.

In the card 101 of the comparative example, a space A was generated between the top surface of the hologram protective layer 127 and the lower surface of the surface layer 130 around the emboss 170 after embossing. This is considered a phenomenon in which a part of the surface layer 130 and hologram protective layer 127 have peeled away.

On the other hand, such a space A did not occur in the card 201 of the second embodiment.

One of the causes for the space A being generated in the card 101 of the comparative example in this way is considered to be for the following reason.

As shown in FIG. 4A, the lower substrate 211 and upper substrate 213 of the second embodiment are laminated via the adhesion layer 212; therefore, a certain displacement in the planar direction (XY plane direction) is permitted during bending in an effect to deform individually.

On the other hand, as shown in FIG. 4B, the card substrate 110 of the comparative example is formed from one layer; therefore, it is made to deform as one body during bending. For this reason, a radius of curvature R110 during bending of the card substrate 110 of the comparative example is larger than the radius of curvature of the card substrate 210 of the second embodiment by the thickness of the lower substrate 211 and adhesion layer 212.

For this reason, the elongation amount of a top surface vicinity 110a of the card substrate 110 of the comparative example becomes larger than the elongation amount of a top surface vicinity 210a of the upper substrate 213 of the second embodiment.

The same phenomenon is considered to happen also during embossing.

As shown in FIG. 3B, for this reason, the elongation amount of the upper surface vicinity 110a of the card substrate 110 of the comparative example becomes a larger elongation amount than the upper surface vicinity 210a of the card substrate 210 (upper substrate 213) of the second embodiment. It should be noted that, since the hologram layer is arranged on the top surface of the card substrate, if the card substrate top surface is elongated, it will elongate integrally with the card substrate top surface.

For this reason, the stress occurring in the hologram protective layer becomes larger as the elongation amount of the top surface of the card substrate increases. For this reason, the stress of the hologram protective layer 127 of the comparative example becomes larger than the stress of the hologram protective film 227 of the second embodiment. This stress is considered to be one occurrence factor of the space A at the hologram protective layer 127 of the comparative example.

In contrast, the card 201 of the second embodiment could suppress the occurrence of such a space A by bonding the lower substrate 211 and upper substrate 213 with the adhesion layer 212.

In addition, during bending as shown in FIG. 4, the card 201 can maintain an improvement in peeling suppression between the surface layer 230 and hologram protective layer 227 for the above reason. For this reason, the card 201 can maintain the inhibiting effect of degradation in the appearance caused by repeat bending, and thus can improve durability.

(Reason for Embedding Hologram Layer 220 Inside Card)

The card 201 of the embodiment is not laminating the hologram layer 220 on the card top surface 201a, but rather is a form embedding in the bottom side Z1 of the surface layer 230. The reason for embedding in this way is because there is a possibility of the function required in the card to decline more than conventionally if laminated on the card upper surface. For example, there is the following function.

In this case, since the magnetic strip will be arranged more to the bottom side Z1 than the hologram layer, the information reading performance of the reader will be inferior.

Although a silver foil must be transcribed to the top surface of the emboss, in this case, it is difficult for the silver foil to be transcribed to the surface of the hologram layer.

In this case, a Lippmann hologram layer is arranged as the topmost surface. The Lippmann hologram layer tends to be weak to embossing, and thus breaking tends to occur.

It should be noted that, if breaking occurs in the topmost surface, the emboss will split down to the bottom layer thereof, starting from this break.

In this case, since peeling of the hologram layer is easy, the forgery inhibitory effect becomes little, and the security may decline.

In addition, in the case of laminating the hologram layer on the card top surface, the hologram layer must be laminated on the entirety of the top surface of the surface layer. This is because, if the hologram layer is made smaller than the surface layer 230, since the outer edge portion of the hologram layer will be visible, the appearance will be inferior. In the case of laminating the hologram layer in this way over the entirety of the top surface of the surface layer 230, since the expensive Lippmann hologram layer will become larger, the card will also become high cost.

In other words, the card 201 of the embodiment maintains the above-mentioned functions, and by embedding the hologram layer 220 inside and providing the gradation portion so as to enable production at low cost, the hologram layer 220 is formed to be small without allowing the appearance to decline.

As explained above, the card 201 of the present embodiment can improve the emboss processability and durability to bending. In addition, the magnetic strip 231, etc. of the card interior can be concealed, and thus the appearance can be improved.

Third Embodiment

Next, a third embodiment of the present invention will be explained.

Figures 5A, 5B, 5C:
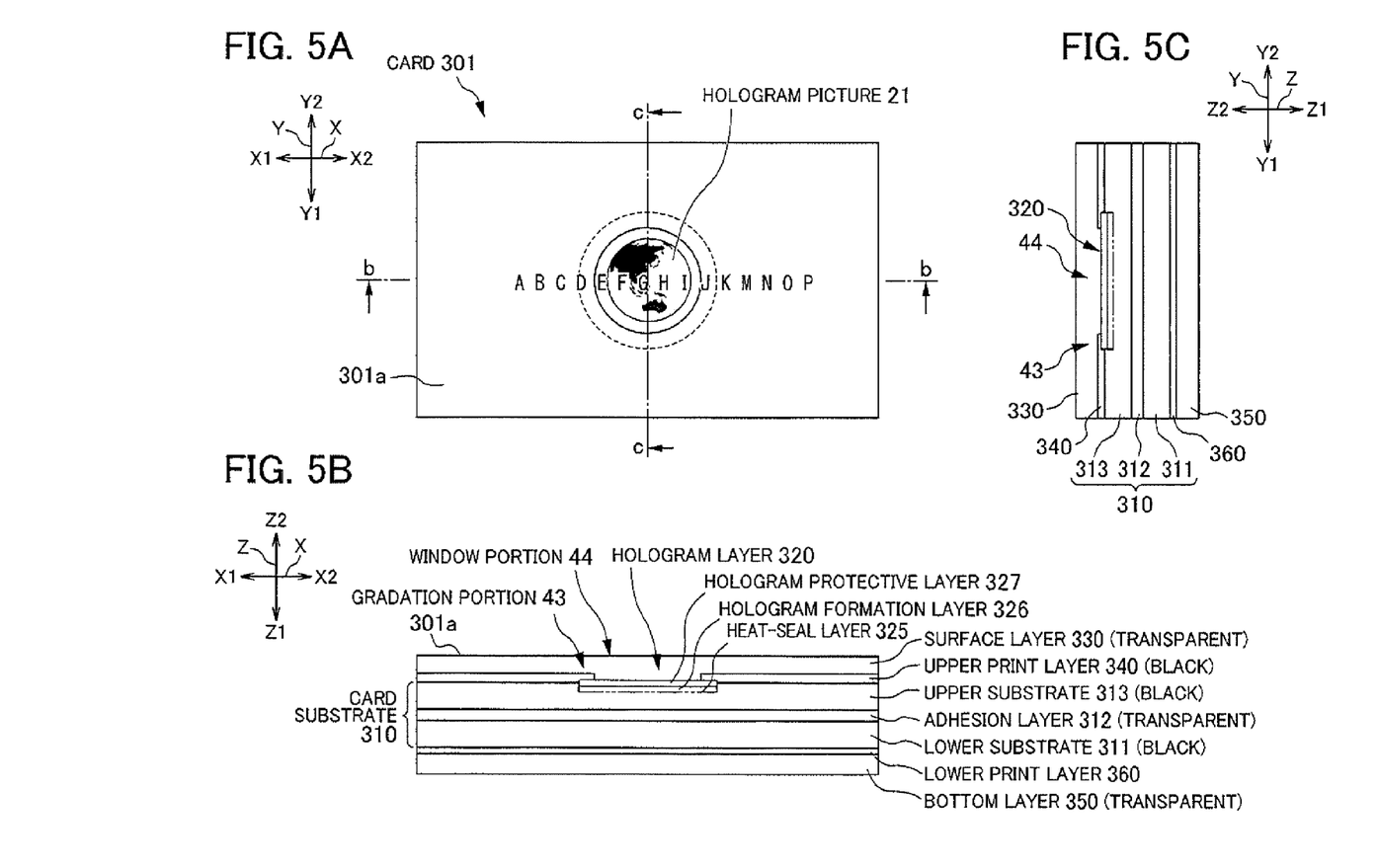
FIGS. 5A-5C are a plan view and cross-sectional views of a card 301 of a third embodiment.

FIGS. 5A-5C are a plan view and cross-sectional views of a card 301 of a third embodiment (drawing corresponding to FIG. 2).

The card 301 has the following different configurations when compared with the second embodiment.

The card 301 does not have a magnetic strip 231 (refer to FIG. 2) provided.

The card 301 has an upper print layer 340 provided on the lower surface of the surface layer 230.

Since the card 301 does not have the magnetic strip 231 provided, it is not necessary to conceal this. For this reason, the upper print layer 340 is arranged on the lower surface of the surface layer 230.

The card 301 thereby exerts the following effects. Since the upper print layer 340 is not exposed, it is possible to suppress staining of the upper print layer 340.

In addition, only the hologram layer 320 is present between the upper print layer 340 and top surface of the upper substrate 313 in the laminating direction Z at the gradation portion 43.

For this reason, the distance between the upper print layer 340 and the top surface of the upper substrate 313 is smaller than in the second embodiment. The sense of unity between the black color of the upper print layer 340 and the black color of the upper surface of the upper substrate 313 is thereby improved, whereby an improvement in appearance can be maintained.

As explained above, the card 301 of the present embodiment can suppress staining of the upper print layer 340. In addition, the sense of unity of the upper print layer 340 and upper substrate 313 is improved, whereby the improvement in appearance can be maintained.

Fourth Embodiment

Next, the fourth embodiment of the present invention will be explained.

Figure 6A:
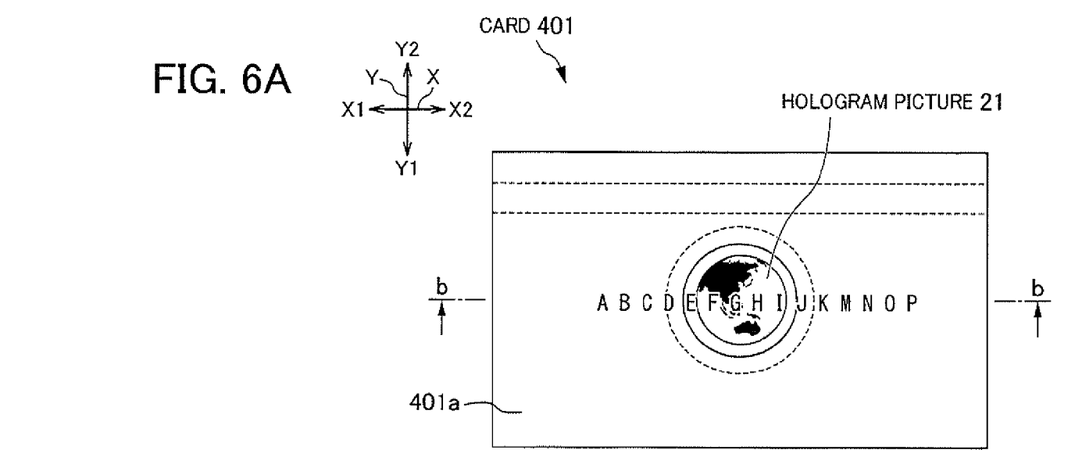
FIGS. 6A-6B are a plan view and cross-sectional views of a card 401 of a fourth embodiment.
Figure 6B:
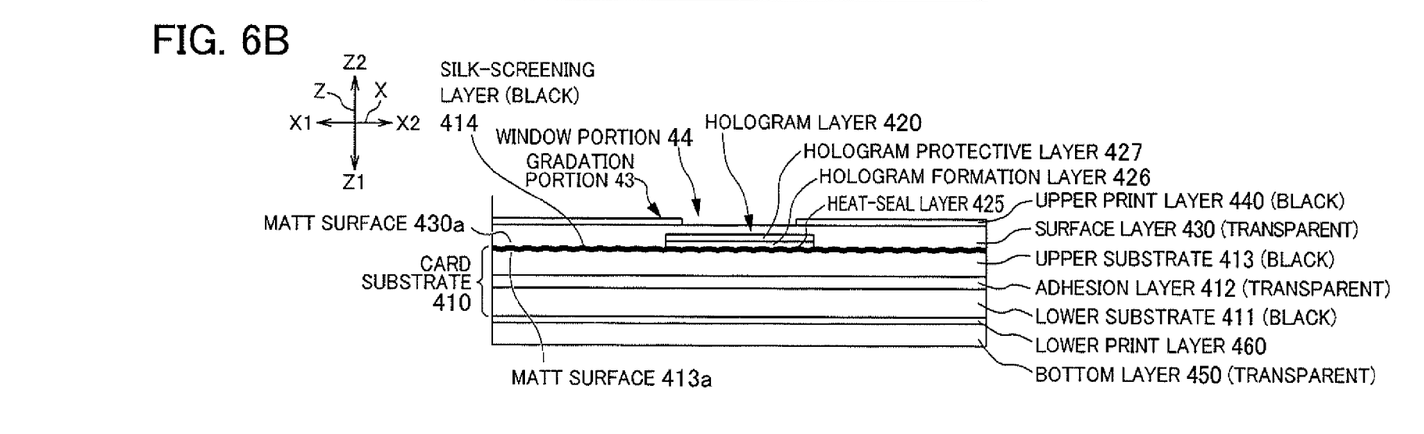

FIG. 6 is a plan view and cross-sectional views of a card 401 of a fourth embodiment.

The card 401 has the following different configurations when compared with the second embodiment.

A black silk-screening layer 414 (printing adhesive layer) is included on the top surface of the upper substrate 413.

The top surface of the upper substrate 413 is a matt surface 413*a* having surface irregularities.

The lower surface of the surface layer 430 is a matt surface 430*a* having surface irregularities.

Herein, matt surface refers to a surface with irregularities in the surface. Matt finishing employs a technique of spraying fine sand onto a plastic film by sand blasting, or forming irregularities of a pressing plate in the plastic film, etc., for example.

The silk-screening layer 414 has an adhesive material between the top surface of the upper substrate 413 and the lower surface of the surface layer 430, and an adhesive material between the top surface of the upper substrate 413 and the lower surface of the hologram layer 420.

The matt surfaces 413*a* and 430*a* can improve the bonding performance of the silk-screening layer 414 by increasing the bonding area. In other words, the matt surfaces 413*a* and 430*a* can improve the adhesiveness between the top surface of the upper substrate 413 and lower surface of the surface layer 430, and the adhesiveness between the top surface of the upper substrate 413 and the lower surface of the hologram layer 420.

Herein, the matt surfaces 413*a* and 430*a* may appear wavy when observed from the card top surface (surface) 401*a*.

With the present embodiment, this phenomenon of appearing wavy is decreased by providing the black silk-screening layer 414, whereby the appearance can be improved.

In other words, the card 401 of the present embodiment provides the matt surfaces 413*a* and 430*a* to the top surface of the upper substrate 413 in order to improve adhesiveness, and further provides the silk-screening layer 414 so as to remarkably improve the bonding performance and now allow the appearance to decline.

As explained above, the card 401 of the present embodiment can improve the adhesiveness between the upper substrate 413 and the surface layer 430 and the adhesiveness between the upper substrate 413 and the hologram layer 420, without allowing the appearance to decline.

It should be noted that, since the present embodiment has the black silk-screening layer 414, the substrate color itself of the upper substrate 413 may not be black. This is because, when observing the card top surface 401*a*, the upper substrate 413 is concealed by the silk-screening layer 414.

In addition, the configuration of the present embodiment may be applied to the third embodiment. In this case, since the distance between the silk-screening layer 414 and upper print layer 440 in the laminating direction Z becomes small, the appearance improving effect can be improved.

Although embodiments of the present invention have been explained above, the present invention is not to be limited to the aforementioned embodiments, and various modifications or changes are possible as in the modified embodiments described later, and these are also within the technical scope of the present invention. In addition, the effects described in the embodiments are merely listing of most ideal effects produced from the present invention, and the effects from the present invention are not to be limited to the matters described in the embodiments. It should be noted that the aforementioned embodiments and modified embodiments described later can also be employed by combining as appropriate; however, a detailed explanation is omitted.

Modified Embodiments (1) In the embodiment, an example is illustrated in which the card top surface is a mirror finish surface; however, it is not limited thereto. For example, the card top surface may be finished to matt form having surface irregularities (frosted finish). In this case, the edge portion of the hologram layer can be more obscured by decreasing the light penetrating the surface layer; therefore, the effect of screening the edge portion of the hologram layer can be improved. In addition, scratches in the top surface can be made inconspicuous.

It should be noted that, in matt finishing the card top surface, it is sufficient so long as providing a step of pressing the card top surface with a plate in which a matt shape is formed.

(2) The embodiments illustrate examples in which the hologram layer is of Lippmann type; however, it is not limited thereto. For example, the hologram layer may be of emboss type.

(3) The embodiments illustrate examples in which the gradation portion does not overlap a picture portion of the hologram; however, it is not limited thereto. The gradation portion may be formed so as to overlap the picture portion of the hologram, and the color shadings to become lighter approaching the inside. In this case, the picture can be observed so that the periphery blurs and becomes shaper approaching the inside, by way of the gradation portion.

(4) The embodiments illustrate an example in which the laminated body is a card; however, it is not limited thereto. For example, the laminated body may be employed in a coupon or the like.

(5) The embodiments illustrate examples in which the color of the print layers and card substrates are black; however, it is not limited thereto. For example, the color of the print layers and card substrates may be anything so long as the same color. In addition, irrespective of the color of the card substrates and print layers, it is sufficient so long as there is an effect of the print layer concealing the edge portion of the hologram layer.

(6) The second and third embodiments illustrate examples in which the card substrate is configured by two layers (upper substrate and lower substrate); however, it is not limited thereto. The card substrate may be configured by three or more layers.

The invention claimed is:

1. A laminated body having a hologram, comprising:
a substrate;
a transparent hologram layer laminated on a part of the substrate, the transparent hologram layer including an image portion and a transparent portion; and
a surface layer laminated above the substrate and the transparent hologram layer, the surface layer being formed from a transparent material and having a print layer printed thereon in a same color as a top surface of the substrate,
wherein when a top surface of the laminated body is viewed in a direction of a normal line with respect to the top surface of the laminated body,
a shading of an edge of the transparent hologram layer is equal to a shading of the top surface of the substrate; and the print layer includes a gradation portion in which a gradation shading decreases gradually in an inward direction from an inward portion adjacent to the edge of the transparent hologram layer, wherein the top surface of the substrate becomes gradually more visible at the gradation portion through the transparent portion of the transparent hologram layer and the surface layer as the gradation shading decreases, and wherein the image portion of the transparent hologram layer is visible inward of the gradation portion.

2. The laminated body having a hologram according to claim 1, wherein the edge of the transparent hologram layer overlaps with a portion of increased shading outward of the gradation portion of the print layer, such that the edge of the transparent hologram layer is invisible, when a top surface of the print layer is viewed in a direction of a normal line with respect to the top surface of the print layer.

3. The laminated body having a hologram according to claim 1, wherein visibility of the color of the top surface of the substrate increases gradually in an inward direction at the gradation portion, such that only the color of the top surface of the substrate is visible at an inward edge of the gradation portion, and the gradation portion and the substrate are seen without a boundary therebetween, when a top surface of the print layer is viewed in a direction of a normal line with respect to the top surface of the print layer.

4. The laminated body having a hologram according to claim 1, wherein the print layer is provided at the top surface of the surface layer.

5. A card having a hologram, comprising:

a substrate;

a transparent hologram layer laminated on a part of the substrate, the transparent hologram layer including an image portion and a transparent portion; and a surface layer laminated above the substrate and the transparent hologram layer, the surface layer being formed from a transparent material and having a print layer printed thereon in a same color as a top surface of the substrate, wherein when a top surface of the card is viewed in a direction of a normal line with respect to the top surface of the card, a shading of an edge of the transparent hologram layer is equal to a shading of the top surface of the substrate; and the print layer includes a gradation portion in which a gradation shading decreases gradually in an inward direction from an inward portion adjacent to the edge of the transparent hologram layer, wherein the top surface of the substrate becomes gradually more visible at the gradation portion through the transparent portion of the transparent hologram layer and the surface layer as the gradation shading decreases, and wherein the image portion of the transparent hologram layer is visible inward of the gradation portion.

* * * * *